# 2,914,554

PRODUCTION OF PHTHALIC ACID ESTERS BY THE CARBONYLATION OF HALOGENATED BENZENE COMPOUNDS

Hugo Kroeper, Heidelberg, Friedrich Wirth, Ludwigshafen (Rhine)-Oggersheim, and Otto Huchler, Ludwigshafen (Rhine), Germany, assignors to Badische Anilin- & Soda-Fabrik Aktiengesellschaft, Ludwigshafen (Rhine), Germany No Drawing. Application May 16, 1958
Serial No. 735,701

Claims priority, application Germany June 4, 1957

9 Claims. (Cl. 260—475)

This invention relates to a process for the production of aromatic carboxylic acid esters. In particular the invention relates to a process for the production of the various phthalic acid esters from dihalogenbenzenes or halogenated benzoic acids or their esters.

It is already known that carboxylic acid esters are obtained by reacting unsaturated hydrocarbons with carbon monoxide and an alcohol in the presence of metal carbonyls or carbonyl-forming metals at elevated temperature and increased pressure. Methods are also known for the production of aromatic carboxylic acid esters by carbonylation of chlorbenzene or dichlorbenzene in the presence of compounds containing hydroxyl groups and carbonyls of metals of the iron group or their triphenylphosphine compounds. Carboxylic acid esters are also obtained by reaction of aryl halides with alkyl formates, dialkyl carbonates, dialkyl oxalates and alkyl ortho-esters in stoichiometrical proportion in the presence of metal carbonyls and also by reaction of aryl halides with dialkyl ethers and carbon monoxide in the presence of copper-zinc catalysts or in the presence of nickel carbonyl and iodine. All these known methods have the disadvantage that either they work with comparatively difficultly accessible initial materials or they yield very fluctuating yields, in some cases bad yields.

We have now found that considerably better yields of phthalic acid esters are obtained by reacting dihalogenbenzenes or monohalogenbenzoic acids or their esters in an anhydrous medium with alkali alcoholates and carbon monoxide under increased pressure and at elevated temperature.

As initial materials for this reaction there are suitable dihalogenbenzenes, especially the chlorbenzenes and the brombenzenes, and also simple halogen-substituted benzoic acids or their esters. For the production especially of terephthalic acid esters, para-dichlorbenzene is above all of importance as initial material. Besides this, para-dibrombenzene, meta-dichlorbenzene and meta-dibrombenzene, para-chlorbenzoic acid or its esters and meta-chlorbenzoic acid or its esters are also capable of being used as initial materials for the various phthalic acids.

The reaction is carried out at elevated temperature, for example at 100° to 400° C., preferably at 300° to 380° C., and under increased carbon monoxide pressure, for example at 5 to 700 atmospheres, preferably at 150 to 700 atmospheres. These pressure values relate to pure carbon monoxide. If gases containing carbon monoxide are used instead of pure carbon monoxide, the said pressure ranges apply to the partial pressure of the carbon monoxide.

As alcoholates there are suitable alkali alcoholates, especially those derived from primary saturated monohydric alcohols such as methanol, ethanol or propanol. The alcoholates of sodium and potassium are especially suitable for carrying out the process technically. The reaction of the dihalogenbenzenes or monohalogenbenzoic acids or their esters takes place in approximately stoichiometrical proportions; this means for example that 2 mols of sodium methylate are used for each mol of dichlorbenzene, or 1 mol of sodium methylate for each mol of a chlorbenzoic acid ester. Either of the two reaction components may also be used in a slight excess, for example an excess of up to 0.1 mol. It is, however, preferable to react the two components in stoichiometrical proportions.

Anhydrous medium means the exclusion of water during reaction. Solvents may be present during the reaction, as for example hydrocarbons, such as benzene and gasoline, but preferably alcohols. It is suitable to use as solvent the alcohol corresponding to the alcoholate. As the reaction is carried out in anhydrous medium the solvents which may be used should also be anhydrous.

It is advantageous to carry out the reaction in the presence of substances which accelerate the reaction. Substances which have the effect of accelerating the reaction are above all the metal carbonyls, for example the carbonyls of nickel, cobalt, iron, molybdenum and chromium, or metal carbonyl hydrides, for example cobalt carbonyl hydride, or complex metal carbonyl compounds, such as $Fe(CO)_4Br_2$; $R_3P_2Ni(CO)_2$ or $R_3PNi(CO)_3$, in which R represents a hydrocarbon radical, especially an alkyl group or an aryl group. It is also unnecessary to add the metal carbonyl compounds as ready-made compounds, but on the contrary they may also be formed from their components during the reaction. Thus for example it is sufficient to add the carbonyl-forming metals themselves in fine dispersion to the reaction mixture.

It is advantageous to use those compounds of the carbonyl-forming metals as are soluble in the reaction medium, for examples the salts of organic acids, such as the acetates and formates, or complex compounds, such as enolates, as for example the acetylacetonates or acetylacetates. The addition of nickel formate, nickel acetate, nickel acetylacetate and nickel acetylacetonate has, inter alia, proved suitable. The metals, metal carbonyls or metal compounds may be added to the initial material in amounts of 0.1 to 3% by weight, preferably 0.2 to 1.5% by weight, with reference to the content of carbonyl-forming metal.

The process may be carried out discontinuously or continuously. When carrying out the process discontinuously, the initial material may for example be heated in a closed vessel with the addition of carbon monoxide. The pressure in general necessary for the reaction is set up by the heating itself. If the necessary pressure is not reached or it is desired to work at higher pressure, the desired pressure may be set up by forcing in further carbon monoxide or inert gas, as for example nitrogen.

Since the process is carried out without the presence of water and therefore there is no strong attack on the apparatus, it is not necessary to work in corrosion-proof apparatus.

The following examples will further illustrate this invention but the invention is not restricted to these examples. The parts specified in the examples are parts by weight.

Example 1

147 parts of para-dichlorbenzene, 108 parts of sodium methylate and 500 parts of dry methanol are charged into a pressure vessel. After forcing in 100 atmospheres of carbon monoxide, the vessel is heated to 340° C. for 10 hours. The pressure thereby rises to 320 atmospheres. By the addition of 500 parts of water to the reaction product, the sodium chloride formed is brought into solution and the dimethyl terephthalate, which was in solution, is precipitated. After separating the aqueous solution, 160 parts of dimethyl terephthalate are obtained. From the aqueous solution there are obtained by acidification further 10 parts of free terephthalic acid. The yield of ester is 82.5% of the theoretical yield and the yield of terephthalic acid, including the ester, is 88.5% of the theoretical yield.

*Example 2*

147 parts of para-dichlorbenzene, 108 parts of sodium methylate and 500 parts of dry methanol are charged with 3 parts of nickel carbonyl into a pressure vessel. After forcing in 100 atmospheres of carbon monoxide the vessel is heated for 3 hours at 340° C., whereby the pressure rises to 320 atmospheres. From the product to which 500 parts of water are added, there are recovered 165 parts of crude dimethyl terephthalate and 7 parts of free terephthalic acid which is contained as the sodium salt in the aqueous solution. The yield of ester is 85% and of terephthalic acid, including the ester, 89% of the theoretical yield.

*Example 3*

To a vertical high pressure tube filled with filler bodies there is supplied per hour one quarter of the capacity of the tube of a mixture, which is homogeneous at 30° C., of 147 parts of para-dichlorbenzene, 108 parts of sodium methylate and 700 parts of dry methanol by means of a high pressure pump, together with carbon monoxide. The tube temperature is kept constant at 330° C. and the partial pressure of the carbon monoxide is kept constant at 150 atmospheres. The reaction product passes into a cooled separator in which an equal weight of water is added thereto with constant stirring, separation into dimethyl terephthalate and aqueous methanol solution thereby taking place.

The yield of dimethyl terephthalate amounts to 78% of the theoretical amount. 7% of free terephthalic acid are obtained as a by-product.

*Example 4*

147 parts of para-dichlorbenzene, 108 parts of sodium methylate, 500 parts of dry methanol and 3 parts of nickel formate are charged into a pressure stirring vessel. After forcing in 100 atmospheres of carbon monoxide, the vessel is heated for 5 hours at 350° C. while stirring, the pressure thereby rising to 340 atmospheres. From the reaction product, to which 500 parts of water have been added, there are isolated 155 parts of crude dimethyl terephthalate. From the aqueous solution there are obtained by acidification a further 8 parts of free terephthalic acid. The total yield of ester is 80% of the theoretical yield and the total yield of terephthalic acid including the ester is 84% of the theoretical yield.

We claim:

1. A process for the production of phthalic acid esters which comprises reacting a compound selected from the group consisting of dichlorobenzene, monochlorinated benzoic acid, and monochlorinated benzoic acid ester, with alkali alcoholate in an anhydrous medium in the presence of carbon monoxide at a temperature of from 100° to 400° C. and a pressure of from 5 to 700 atmospheres.

2. A process as claimed in claim 1 wherein the reactants are used in approximately stoichiometrical quantities.

3. A process as claimed in claim 2 wherein the reaction is accelerated by the addition of 0.1 to 3.0% by weight of a carbonylation catalyst.

4. A process for the production of terephthalic acid esters which comprises reacting p-dichlorbenzene with an alkali alcoholate in an anhydrous medium in the presence of carbon monoxide at a temperature of from 100° to 400° C. and at a pressure of from 5 to 700 atmospheres.

5. A process for the production of terephthalic acid esters as claimed in claim 4 wherein the reactants are used in approximately stoichiometrical quantities.

6. A process as claimed in claim 5 wherein the reaction is accelerated by the addition of 0.1 to 3.0% by weight of a carbonylation catalyst.

7. A process for the production of dimethyl terephthalate which comprises reacting p-dichlorbenzene with sodium methylate in a molar ratio of about 1:2 in an anhydrous medium in the presence of carbon monoxide at a temperature of from 100° to 400° C. and at a pressure of from 5 to 700 atmospheres.

8. A process for the production of dimethyl terephthalate which comprises reacting p-dichlorbenzene with sodium methylate in a molar ratio of about 1:2 in an anhydrous medium in the presence of carbon monoxide and nickel carbonyl at a temperature of from 100° to 400° C. and at a pressure of from 5 to 700 atmospheres.

9. A process for the production of dimethyl terephthalate which comprises reacting p-dichlorbenzene with sodium methylate in a molar ratio of about 1:2 in an anhydrous medium in the presence of carbon monoxide and nickel formate at a temperature of from 100° to 400° C. and at a pressure of from 5 to 700 atmospheres.

References Cited in the file of this patent

UNITED STATES PATENTS 2,734,912    Leibu _____ Feb. 14, 1956